United States Patent [19]

Barzilai et al.

[11] Patent Number: 4,736,369
[45] Date of Patent: Apr. 5, 1988

[54] ADAPTIVE SESSION-LEVEL PACING

[75] Inventors: Tsipora P. Barzilai, Millwood, N.Y.; Raymond F. Bird, Durham, N.C.; James P. Gray, Chapel Hill, N.C.; Bharath K. Kadaba, Peekskill, N.Y.; James B. Kalmbach, Jr., Raleigh, N.C.; Jeffrey G. Knauth, Raleigh, N.C.; Diane P. Pozefsky, Chapel Hill, N.C.

[73] Assignee: International Business Machines Corp., Armonk, N.Y.

[21] Appl. No.: 873,908

[22] Filed: Jun. 13, 1986

[51] Int. Cl.$^4$ .............................. H04J 3/24; H04J 3/16
[52] U.S. Cl. ......................................... 370/94; 370/82; 370/79
[58] Field of Search ....................... 370/82, 83, 84, 94, 370/89, 95, 79

[56] References Cited

U.S. PATENT DOCUMENTS 4,519,068 5/1985 Krebs et al. .......................... 370/94
4,646,292 2/1987 Bither .................................. 370/89

Primary Examiner—Douglas W. Olms
Assistant Examiner—Wellington Chin
Attorney, Agent, or Firm—Joscelyn G. Cockburn

[57] ABSTRACT

A technique called "Adaptive Pacing" permits a receiving node, in a computing networking, to change the size of an information window during an active session. To effect the change, the receiving node sends an "Isolated Pacing Message" (IPM) to the sending node. Thereafter, the sending node adjusts the window size to conform with a window size value in the IPM. The IPM includes a type field, a reset window indicator and a next window size field. There are three types of isolated pacing messages. Two of the messages are used by the receiving node to control the flow of data; while the third message is used, by the sending node, to confirm the beginning of a new window and the ending of an old one.

17 Claims, 8 Drawing Sheets

ADAPTIVE SESSION-LEVEL PACING

BACKGROUND OF THE INVENTION

1. Field of the Invention

The present invention relates to computer networks in general and more particularly to protocols and techniques that improve the flow of information within said networks.

2. Prior Art

The use of computer network systems for processing and transmitting data is well known in the prior art. A typical computer network system consists of at least one host computer running under some type of operating system, communication controllers, communications media and a plurality of end users (terminals, printers, displays, etc.). The host computer is connected, via communications media, to either a communication controller or an end user terminal. The communication controller interfaces with other communication controllers or end user terminals via communications media. The communications media may be telephone lines, channels, satellites, etc. By entering a request at a user's terminal, the user may extract data from the host computer. Similarly, a user may enter information on a terminal and have it transmitted to the host computer for processing and/or to another terminal in the network.

In addition to the physical structure, the prior art computing systems are controlled by a system architecture which ensures the orderly flow of information throughout the system. The prior art describes several types of architectures. For example, an overview of the architecture used in computer networks is given in an article entitled, "Computer Network Architecture," by S. Wecker in *Computer,* September 1979. Another overview, including a description of System Network Architecture (SNA) is given in an article entitled, "An Introduction to Network Architectures and Protocols," by P. E. Green and printed in the *IBM Systems Journal,* Vol. 18, No. 2, 1979. In these articles, the various computer networks such as SNA, DNA, ARPANET, etc. are described by means of hierarchical architectural layers, where the lowest layer relates to the physical communication lines interconnecting various user nodes of the network and where the highest level concerns the conversation per se between the various end users of the network.

In an attempt to standardize network architecture, the International Organization for Standardization (ISO) has adopted a model that is described by Hubert Zimmerman in an article entitled, "OSI Reference Model—The ISO Model of Architecture for Open Systems Interconnections," *IEEE Transactions on Communications,* April 1980. The model architecture consists of sevel layers, namely: physical, data link, network, transport, sessions, presentation and application layers. The present invention mainly concerns the transmission services layer of SNA, which relates to the methods used to transmit information across the network.

People who design computer networks are always looking for ways to control the flow of data in the network. Formats and protocols are used to control the flow of information between network entities or network nodes. Whereas protocols refer to the total set of rules that govern information exchange within the network, formats govern the structure of the exchanged message. The prior art sets forth several formats and protocols used to improve information flow. For example, U.S. Pat. No. 4,205,200 describes a technique for controlling the size of bytes making up a field of data to be serially transmitted from one station to another. Each message carries a first pre-header byte that contains information as to whether or not a change in the byte size of the data field is to occur and a second pre-header byte that contains information representative of the size of the change. U.S. Pat. No. 4,410,889 sets forth a technique for synchronizing stations that transmit variable length messages. U.S. Pat. No. 4,527,267 describes a technique for coupling the X.25 access protocol and the internal protocol of a utilization device. The X.25 access protocol contains a D-bit that indicates whether an acknowledgement of packet communication can be local or must be end-to-end. Finally, U.S. Pat. Nos. 4,517,669 and 4,519,068 describe formats for carrying variable length messages between units of a communications system.

Session-level pacing is another prior art technique used to control the flow of information in a communications network. Session level pacing allows a receiving logical unit (LU) in a structured architecture, such as SNA, to control the rate at which it receives data from a sending LU. In the past, pacing was done on a static basis. The receiving LU controls when the sending LU may send a window of packets, but the number of packets in a window is fixed at session activation and cannot be adjusted dynamically. A more detailed description of session-level pacing is given in Systems Network Architecture Format & Protocol Reference Manual: Architecture Logic (SC30-3112).

Even though fixed session-level pacing works well for its intended purposes, it creates unnecessary constraints on the systems. The constraints are particularly felt by systems that usually have relatively limited resources (such as storage, etc.) but still must service a large amount of data. Such systems require more flexible control over their scarce resources than that which is afforded by fixed session-level pacing.

SUMMARY OF THE INVENTION

It is, therefore, the general object of the present invention to provide an apparatus and method that controls the flow of information more efficiently within a computing network.

It is a more specific objective of the present invention to provide protocols and formats that allow a receiving session partner to control the window size of incoming information.

The objectives of the present invention are achieved by providing an adaptive session pacing mechanism with a pacing request message, an isolated pacing response message and an isolated pacing reset acknowledgement message. The isolated pacing messages (IPMs) enable the receiver to control the window size of messages.

The basic isolated pacing message format includes a type field that carries a sequence of bits indicating the type of IPM, a reset window indicator that carries a bit which, when set, indicates that the sender must stop sending data immediately, and a next window size field that carries a sequence of bits indicating the number of packets a sender may send in the next window.

Generally, a sending node transmits to the receiving node a pacing request having information including user data in the Request Unit (RU) field and the Pacing Indicator (PI) bit set in the Request Header field. If the sending unit is able to send data faster than the receiver is currently receiving it, it may turn on a bit called "Request Larger Window Indicator" (RLWI) indicating that it could use a larger window size than it currently has. The PI and RLWI bits are located in the Request Header (RH) field of the packet.

In response to this packet (the first in the pacing window), the receiver generates and transmits a solicited IPM. The receiver specifies next window size, which refers to the size of the window following the window the sender currently is sending, to be greater than 0. The sender finishes sending the packets in the current window and then sets the size of the next window to the number indicated by the receiver in the solicited IPM. The receiver calculates next window size according to the resources it is willing to commit, and may increase or decrease the size of the window with each solicited IPM. The preferred minimum allowed size of the window may be established at session activation.

At times the receiver may experience a critical shortage of resources, such as storage, and must change the size of the window immediately. In this case the receiver sends an "unsolicited" IPM with the reset window indicator set on. This causes the sender to halt transmission, set the current window size to zero, reset the next window to the size specified by the receiver, and return to the receiver a "reset acknowledgment" IPM. The reset acknowledgement contains the window size from the receiver's unsolicited IPM, confirms the size of the new window, and indicates that no more data from the old window is forthcoming. After sending the reset acknowledgement, the sender begins sending the new window.

It is possible for the receiver to completely halt the flow of data by sending an unsolicited IPM with next window size equal to 0. When the receiver recovers, it sends a solicited IPM with next window size greater than 0, which allows the sender to resume transmission.

The receiver must make an allowance for the data capacity of the communications media in its next window size algorithm. Too large a window wastes buffer resources, and too small a window lower throughput. The sender detects conditions when the current window is too large or too small and relays this information back to the receiver by setting the request larger window indicator. The request larger window indicator only appears in the request header of the first packet of a window sent to the receiver (the pacing request), and is not defined in a response. The receiver factors the sender's request for a larger window into its calculation of the size of the next window, and if it can commit the resources, increases next window size in the solicited iPM it returns to the sender.

The sender detects that the communications media can provide greater throughput than the window size permits if the sender sends an entire window, still has data to send, and has not yet received the solicited IPM. In this case, the sender sets on the request window indicator in the first packet of the next window sent to the receiver.

The sender detects that the size of the window is too large for the communications media capacity if the solicited IPM arrives before the sender finishes sending the entire window. Also, any time the sender does not have more than a window's worth of data to send, a larger window is not needed. In either case, the sender sets off the request larger window indicator in the first packet of the next window.

The foregoing and other objects, features and advantages of the invention are more fully described in the accompanying drawings.

DETAILED DESCRIPTION OF THE PREFERRED EMBODIMENT

The invention to be described hereinafter is intended to be a general informative message that controls the flow of information throughout a computer network. This being the case, the use of this invention is not restricted to any specific type of computer network. However, it works well with the IBM SNA architecture and as such will be described in that environment. However, this should not be contrued as a limitation on the scope of the present invention since it is within the capabilities of one skilled in the computing art to use the invention as is disclosed herein or with slight modification to control the flow of information in other types of networks.

Figure 7:
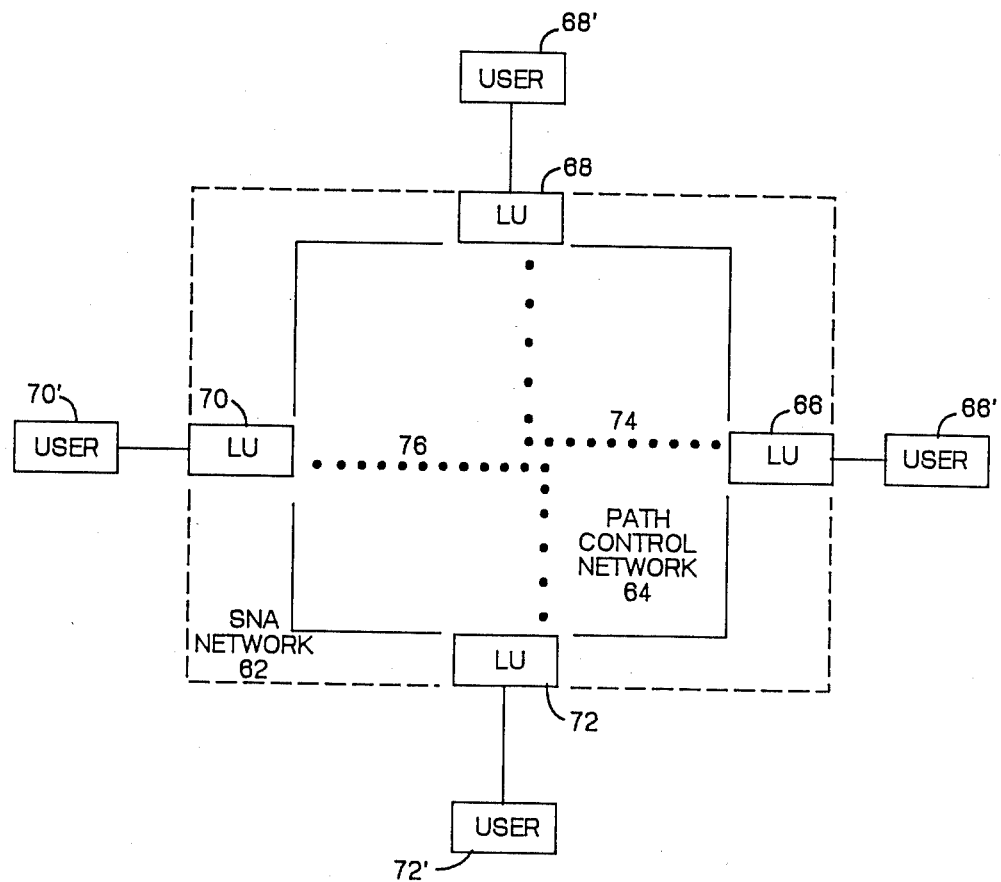
FIG. 7 shows a logical representation of a computer network. The IPM of the present invention can be used to control data flow within the network.

FIG. 7 is a conceptual representation of a typical SNA network in which the flow control protocols (to be described hereinafter) can be used to pace the flow of messages. SNA network 62 includes a path control network 64 and a plurality of logical units (LU) 66, 68, 70 and 72. Each of the logical units couples a user to the SNA network. Thus, LU 66 couples user 66' to the path control network 64, LU 68 couples user 68' to the path control network 64 and so forth. Although not shown, each of the LUs is provided with application programs, I/O devices and associated data bases. Furthermore, the LUs are structured so that their interfaces to their respective application programs (not shown) are user friendly while their interfaces to the path control network are such that messages are efficiently formatted for transmission in the network.

As stated above, the LU is the end user's interface to an SNA network. LUs are attached to the path control network, which is responsible for addressing and routing data packets. Two LUs (such as 66 and 68, or 70 and 72) communicate over a logical connection called a "session". In FIG. 7 the respective sessions are identified by numerals 74 and 76, respectively. Although each LU is shown interconnected by a single session only, it should be noted that multiple sessions can be established between two LUs. Information relative to a session and its establishment is well known in the prior art. Therefore, detailed information will not be given here. Suffice it to say that a session is established when one LU sends another an SNA request known as the "BIND" which specifies the protocols that both partners agree to abide by for the duration of the session. The "BIND" sender and receiver are known respectively as the primary LU (PLU) and secondary LU (SLU). A more detailed description relative to session establishment, etc. can be found in Systems Network Architecture Format & Protocol Reference Manual: Architecture Logic (SC30-3112).

A block diagram showing the physical components of a T2.1 computing network in which the invention can be used is given in an article entitled, "SNA Networks of Small Systems," *IEEE Journal on Selected Areas in Communications,* Vol. SAC-3, No. 3, May 1985. The article is incorporated herein by reference.

Figure 8:
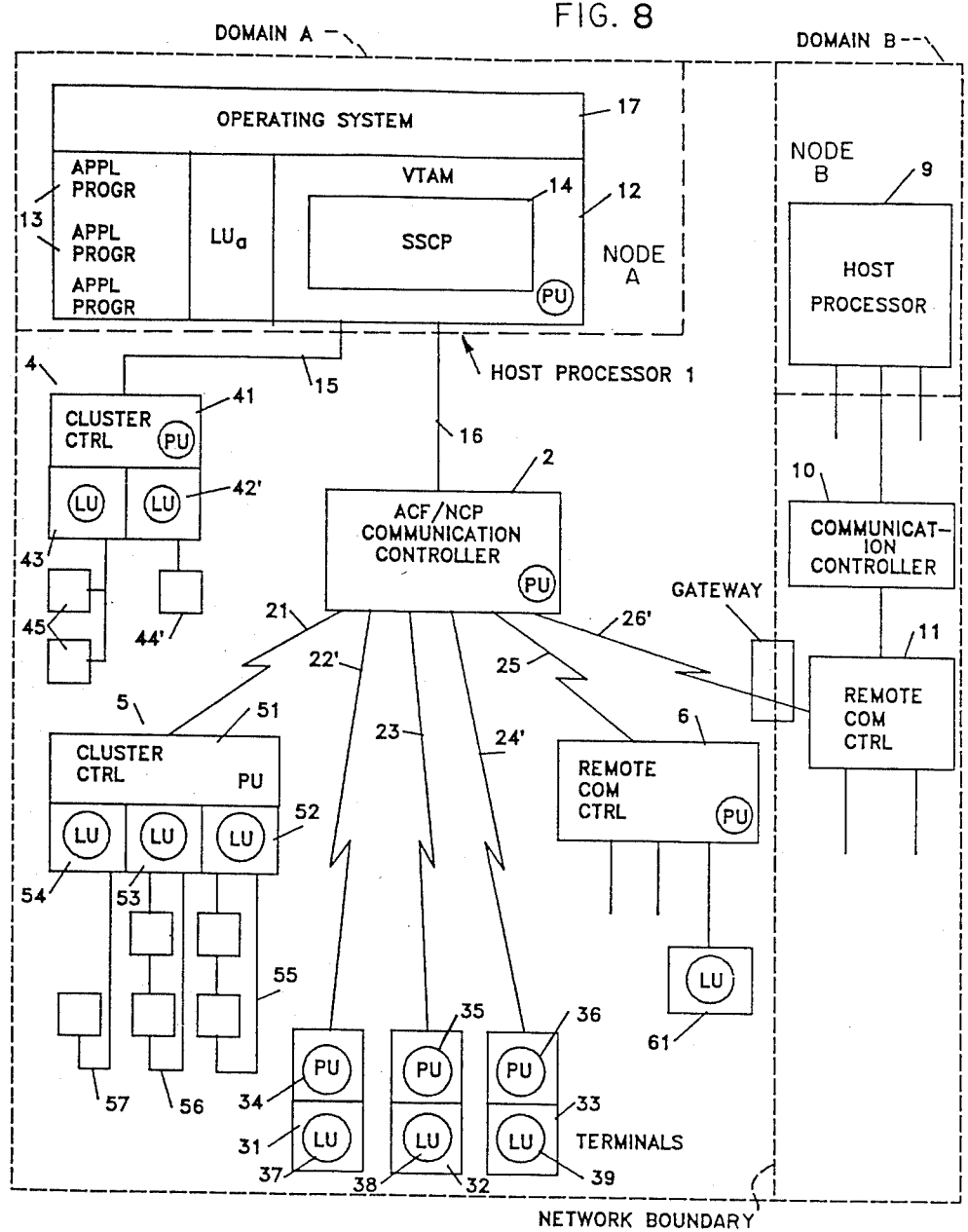
FIG. 8 shows a block diagram of the physical components of a computer network.

FIG. 8 is a block diagram of the physical components in a computing network. The LUs of FIG. 7 are housed in the nodes of FIG. 8. In traditional SNA networks, nodes are categorized as: sub-area nodes which correspond to hosts (also known as type 5 (T5) nodes), and 37X5 controllers (type 4 nodes), which can route packets from one node to another, and peripheral nodes, which correspond to small processors, cluster controllers, and terminal devices ($T_2$, sometimes T1). T1 and $T_2$ devices are attached to the network by sub-area nodes that provide boundary functions for all communication with other nodes. The path control network (FIG. 7) is implemented by the physical network (FIG. 8) of interconnecting nodes and links.

Still referring to FIG. 8, the path control network includes domain A and domain B interconnected to each other by a gateway. Domains A and B have identical structure and components. Therefore, for brevity of description, only domain A will be described in detail. A skeleton representation of the components in domain B is shown to described the interrelationship between the two networks. The network includes a host processor 1 located at node A (domain A) and a host processor 9 located at node B (domain B). The host processors may be any conventional host computers. In the preferred embodiment of this invention the host computers are IBM System 370. The host processor 1 includes an operating system 17, a plurality of application programs 13, and a virtual telecommunication access method (VTAM) 12. A logical unit (LUa) couples the application program to VTAM. The structure of LUa is identical to the structure of the above described LUs. Essentially, LUa accepts instructions and commands from an application program, formulates a message and transports the message from node A to node B. The number of RUs (to be described subsequently) that are allowed to flow between node A and node B could be controlled by the teaching of the present invention.

VTAM contains a system service control point (SSCP) component 14. VTAM is an IBM communication access method that is well known in the prior art and as such details will not be given. Suffice it to say that the system service control point 14 is a component of VTAM that manages a domain of the network. The SSCP performs functions such as bringing up the network, shutting it down, assisting and establishing and terminating the communication between network addressable units, utilizing the algorithm to be described subsequently for formulating transportation units and reacting to network problems (such as failure of the link or control unit). To perform these functions, the SSCP communicates with physical units (PUs) and logical units (LUs). Usually, the communication is within its own domain. A more detailed description of the VTAM/SSCP component is given in "General Information for Virtual Telecommunication Access Method" (GC27-0463 and GC27-0462). The cited literature is incorporated herein by reference.

Still referring to FIG. 8, a communication controller 2 is attached to the host 1 via channel 16, and local cluster controller 4 is attached over channel 15 to the host. The communication controller is a transmission control unit with processing being controlled by a program product called "Advanced Communication Function/Network Control Program" (ACF/NCP). The program product resides in the CPU of the controller. The ACF/NCP communication controller is well known in the prior art and as such details will not be given. Suffice it to say that the main purpose of the network control program is to transmit data received from the host processor to terminals, clusters, or other NCPs and to receive data from the terminal clusters or other NCPs and send it to the host. The NCP can process data in various ways as it passes through the controller. In controlling the flow of data, the NCP must interact with portions of the controller hardware.

On the line side, the NCP interacts with the communications scanner (not shown) and on the channel side it interacts with the channel adapter (not shown). A more detailed description of the controller and its associated control programs is given in the above referenced manual.

The communication controller 2 is connected to remote cluster controller 5 by link 21. Preferably, the well-known SDLC protocols are used for communicating over link 21. Similarly, communication controller 2 is connected over link 25 to a remote communication controller 6 and by means of links 22', 23 and 24' to terminals 31, 32 and 33, respectively. A cross domain link 26' interconnects the communication controller to a remote controller 11 in domain B. The remote communication controller 11 is connected to host processor 9 by communication controller 10. The communication controllers in domain B use control programs similar to those that are used with the communication controllers in domain A.

Each element in the network of FIG. 8 that can send or receive data is assigned a network address and is known as a network addressable unit (NAU). The network address uniquely identifies the element, regardless of whether the element is a device such as a terminal or terminal control unit, programs such as VTAM application programs, a cluster controller, a host processor or a portion of an access method, such as VTAM. The network address is combined with other information necessary to route data to its destination.

It should be noted that SNA defines three types of network addressable units, namely; System Service Control Point (SSCP), physical units (PUs), and logical units (LUs). In FIG. 8, the encircled PU represents a physical unit. It is a portion of the device, usually programming or circuitry or both, that performs control functions for the device in which it is located and, in some cases, for devices that are attached to the device that contains the PU. For the device under its control, the physical unit takes action during activation and deactivation, during error recovery and resetting synchronization, during testing, and during gathering of statistics and operation of the device. Each device in the network is associated with a physical unit. In the local cluster controller 4 there is a physical unit 41 and in the remote cluster controller 5 there is a physical unit 51. There are also physical units in the local communication controller 2 and the remote communication controller 6.

A logical unit (LU) is a device or program that an end user (such as a terminal operator and/or I/O mechanism) uses to access the network. The logical unit may be hardware and/or programs. Within a structured protocol such as SNA, the logical unit comprises the presentations services (PS), data flow control (DFC), and transmission control (TC) layers. For purposes of description, the logical unit may be viewed as an access port into the network. The logical unit may or may not be the original source of a message. The information upon which a request is based may have originated at the device controlled by the logical unit. Similarly, the network sees a logical unit as a destination of a requests unit (RU). A detailed description of the RU and its relevancy to the present invention will be given subsequently. In FIG. 8, a logical unit is shown as an encircled LU. In the local cluster controller 4, there are two logical units 42' and 43. LU 42' controls device 44' while LU 43 controls devices 45. Similarly, cluster controller 5 contains logical units 52-54, controlling devices and loops 55-57. Each of the terminals 31-33 includes PUs 34-36 and LUs 37-39.

Figure 1:
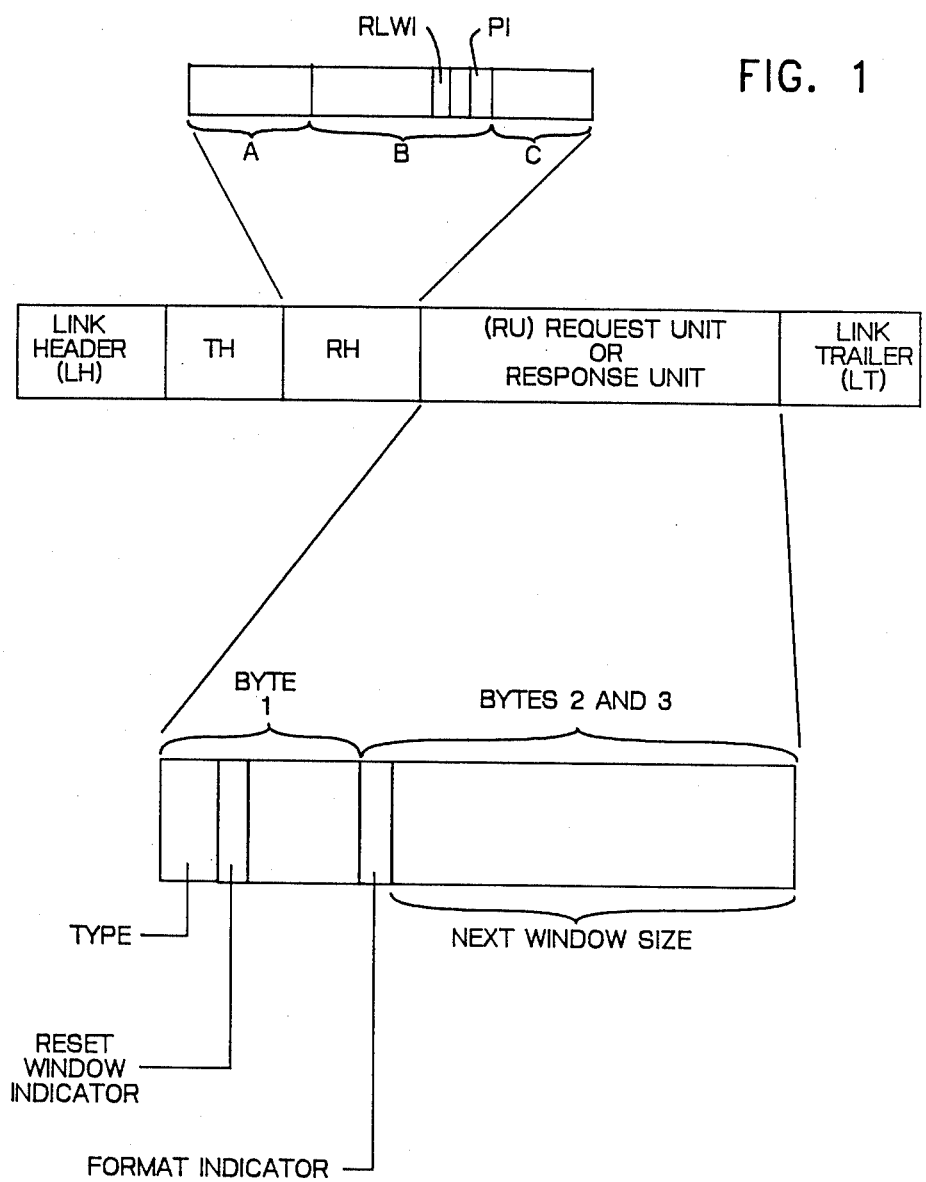
FIG. 1 shows the format for the IPM according to the teachings of the present invention.

FIG. 1 is a graphical representation of a basic link unit (BLU) format according to the teachings of the present invention. The BLU routes messages (data and control information) throughout the computing network of FIGS. 7 and 8. Each node in the above described computing network is fitted with an intelligent device, which may be a computer, microprocessor, CPU, etc. The intelligent device is programmed to generate and process the BLU (to be described hereinafter). Referring again to FIG. 1, the BLU includes a link header (LH), transmission header (TH), request response header (RH), request unit or response unit (RU) and link trailer (LT) fields. The fields are concatenated together and carry vital information that is used for routing the message through the network.

The link header field, transmission header field, and link trailer field are well known in the prior art. Therefore, detailed descriptions of these fields will not be given. Suffice it to say that the transmission header field carries information that is used by path control to route message units through the network. Information such as the addresses of the origin and destination network addressable units (NAUs), explicit route number, and a virtual route number are placed in the transmission header field. The link header and link trailer fields carry information that is used by link control. A more detailed description of the fields is given in the IBM SDLC General Information Manual (No. GA27-3093) which is incorporated herein by reference.

The basic link unit, when encoded according to the teachings of the present invention, is called an isolated pacing message (IPM) or a pacing request. These are used for pacing message between a sending and a receiving node. The coding changes are made in the RU and RH fields. The RH field includes three bytes identified with alphabetical characters A, B and C. The last bit of byte B is the pacing indicator (PI) bit. The bit is set "on" by a data sender to indicate that this request unit (RU) is the first in a new window and that a new pacing window (permission to send some number of request units) is needed. When this bit is "on" and the RU is a request, the message is called a "pacing request." It should be noted that this bit is set "on" in all "isolated pacing messages." A bit prior to the PI bit is the request larger window indicator (RLWI). This bit is set "on" by a data sender in a pacing request to indicate that it could use a larger window size that it currently has. The data sender determines that it can use a larger window when it receives an isolated pacing message, has data that needs to be sent and has no pacing count (to be described subsequently) to send it. The data receiver will increase the size of the next pacing window if it has the buffers available to do so.

A new RU is defined for IPMs: A type field comprising bits 0 and 1 in byte 1. In the preferred embodiment of this invention there are three possible settings for type:

0,0 represents a solicited IPM. The solicited IPM is sent by the data receiver in response to a pacing request. The solicited IPM carries the value to be used as the next window size. This value is always a positive number.

0,1 represents an unsolicited IPM. The unsolicited IPM is sent by the data receiver when it needs to change the current buffer allocation for this session. It carries the value that is to replace the next window size. This value is always a non-negative number. If a 0 is placed in the next window size field (to be described subsequently), the sending node will complete the current transmission and discontinue all future transmission.

1,0 represents a reset acknowledgment. The reset acknowledgment IPM is sent by the data sender in response to an unsolicited IPM. It carries the next window size that the data sender had received in the unsolicited IPM. The reset acknowledgment IPM flows at the same priority as session traffic so that when it is recieved the buffer manager at the data receiver can free all buffers allocated to the session except for the number in the unsolicated IPM's next window size. The buffer manager controls the allocation of resources such as buffers, etc. at the data receiver.

Bit 2 of the first byte is the reset window indicator. This indicator is turned on by the data receiver to inform the data sender that it is to set the residual pacing count (to be described subsequently) to zero for the current window before using the next window size carried in this IPM. If this indicator is not on, the current pacing window is completed before the next window size is used.

Bit 0, byte 2, is the format indicator. Presently its only value is a 0, which indicates that a 15-bit integer follows. Admittedly, this bit could be used to indicate a representation other than a 15-bit integer.

Bits 1-15 represent an unsigned integer whose value indicates the next window size that the data sender is permitted to send. On a reset acknowledgment IPM, the value echoes the value received in the unsolicited IPM. For a solicited IPM a positive value is required. For an unsolicited IPM a non-negative value is required.

Having described the computing network and the format used for shuttling messages within the network, the programs used in the node computers for processing the messages will now be described. The description will first cover programs and techniques practiced at the data sender followed by those techniques practiced at the data receiver.

As stated before, the present invention covers formats, protocols and techniques used for dynamically pacing messages between a sending node and a receiving node. As with all SNA networks, a session is established upon which data is transmitted and a set of protocols is used. Thus, before any transmission is activated, the session has to be established between the session partners. The establishment of sessions within SNA networks is well known within the prior art. Therefore, a detailed description will not be given. Suffice it so say that the logical unit that is responsible for activating the LU-LU session is called the primary LU, and the logical unit that receives the session activation request is called the secondary LU. The selected set of session parameters is the content of the BIND session (BIND) request that the primary LU uses to activate an LU-LU session. The BIND request specifies, as parameters, the protocols that the primary and secondary LUs are to observe when communicating with each other over an LU to LU session. A more detailed description of session establishment, etc. is given in *SNA Technical Overview* (Order No. GC30-3073) which is incorporated herein by reference.

On receipt or sending of a BIND response, a data sender sets its residual pacing count (RPC) to 0 indicating that it is about to start a new window. It also sets the next window size (NWS) to 1 which is the initial window size. Of course, it may set the NWS to a value greater than 1 if such were the agreement between sender and receiver without deviating from the scope of the present invention. With these settings, when the first normal-flow request unit (RU) is to be sent, it will be treated as a first in the pacing window. The data sender then exits the initial routine and enters block 201 of the program shown in FIG. 2.

Figure 2:
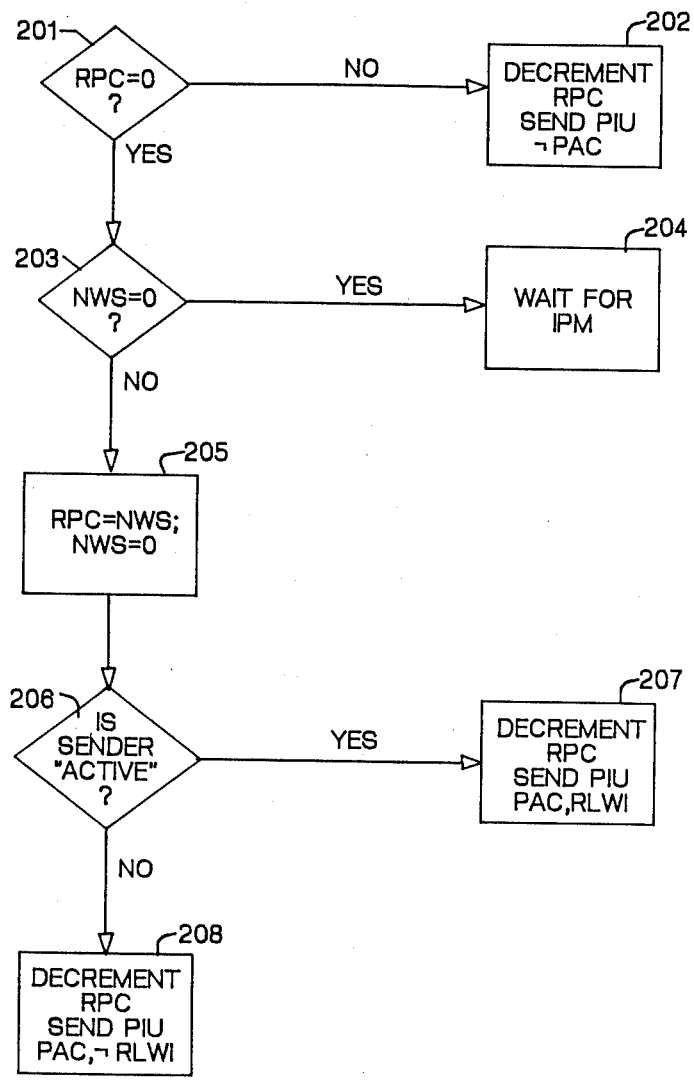
FIG. 2 shows a flow chart of a computer program, at a data sender, for generating a pacing request and sending data.

FIG. 2 shows a computer program that can be used to instruct the computer at a data sender to encode and process PIUs according to the teachings of the present invention. When a data sender has data to send, it enters the program through block 201. In block 201 the program checks to see if the current window is finished. The current window is finished if the residual pacing counter (RPC) is 0. If the RPC is not 0, the program enters block 202. In block 202, the program decrements the residual pacing count and sends out the path information unit (PIU), which includes the request unit (RU), the request header (RH) and the transmission header (TH). Other elements in the sender's node process the PIU to create a BLU Basic Link Unit for transmission on the link. Some SNA nodes may support additional protocols (e.g., segmenting), which do not, however, affect the pacing protocols of this invention. The pacing indicator (PI) in the RH field is set "off" indicating that this is not the beginning of a new window. The data sender then exits the process. If in block 201 the current window is finished, that is, the RPC is a 0, the program goes to block 203.

In block 203 the program checks to see if the next pacing window has already been authorized. The pacing window is authorized if the next window size (NWS) is greater than 0. If the next window size has not been authorized, the program goes into block 204, which requires it to wait for an isolated pacing message. The data sender then exits this process to wait. If the next pacing window has been authorized, that is, the next window size (NWS) is non-zero, the data sender descends into block 205.

In block 205, the data sender makes the current window the size of the next authorized window by setting RPC to NWS and 0'ing (zeroing) NWS. In block 206, the data sender determines whether or not it needs a larger window by determining if it is currently "active." The program for making this determination will be described subsequently. If the sender is "active," the program proceeds to block 207.

In block 207, the data sender decrements the residual pacing count and sends out the PLU with bits in the RH field set to indicate that this is the first PIU of this pacing window and that a new window needs to be authorized. The bit settings are as follows: pacing indicator—PI—(hereinafter called PAC) is "on" and the request larger window indicator—RLWI—is "on" signifying that it is active and can use a larger pacing window if the data receiver can give it RLWI is "on". The data sensor then exits this process.

If, in block 206, the data sender determines that the sender was not active (a technique for making such a determination will be described subsequently), it proceeds to block 208.

In block 208, the data sender decrements the RPC by 1 and sends out the PIU with bits in the RH set to indicate that this is a first PIU of this pacing window and that a new window needs to be authorized (pacing indicator—PAC—is "on") and that it is "lazy" (i.e., not "active") and, therefore, does not need any more pacing count than it is currently being given. The data sender then exits this process.

Figure 3:
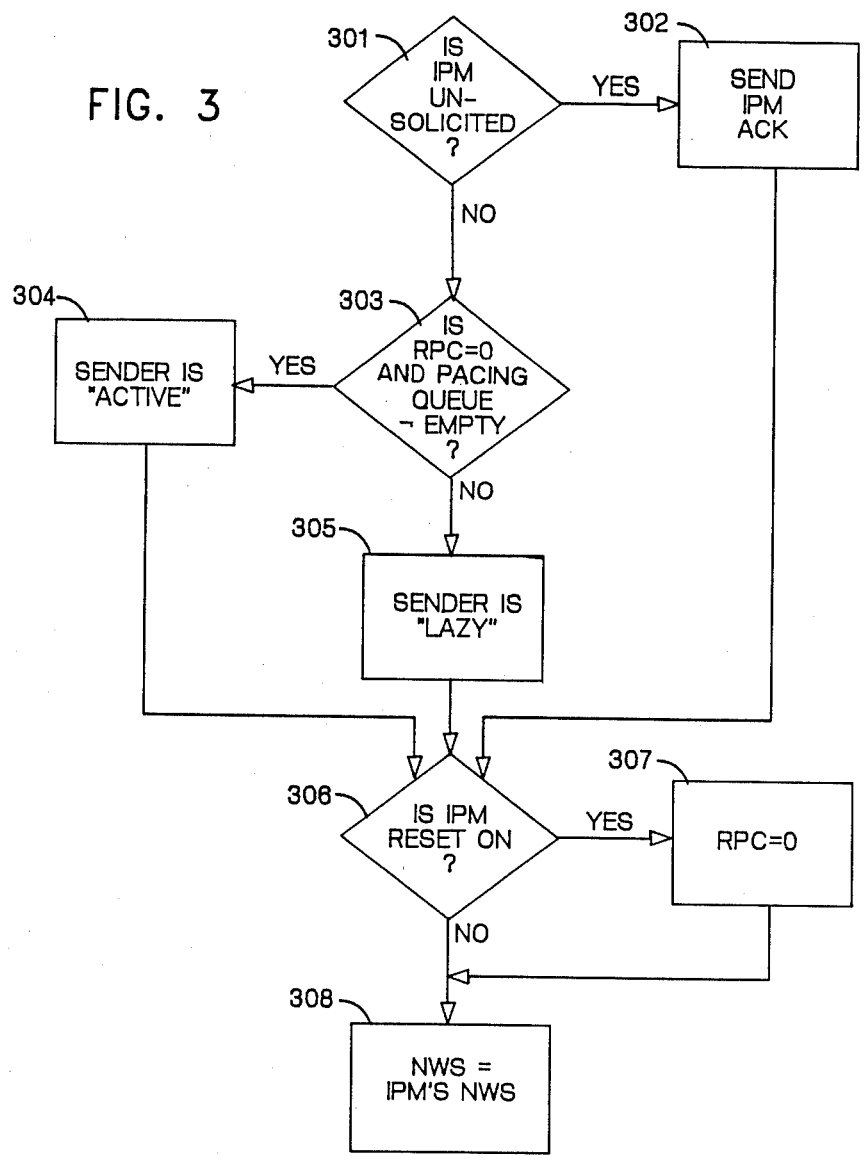
FIG. 3 shows a flow chart of a computer program, at a data sender, for processing a received IPM.

FIG. 3 is a program used by the data sender when it is receiving an IPM. The data sender enters this program in block 301 when it receives either a solicited IPM or an unsolicited IPM from the data receiver. If the IPM is unsolicited, the data sender enters block 302 and sends a reset acknowledgment IPM to the data receiver carrying the next window size that it received in the unsolicited IPM and at the priority of session traffic. The data sender then proceeds to block 306 to update its pacing count fields.

If the IPM is solicited, the data sender proceeds to block 303 to determine if it is "active" or "lazy". If the current pacing window has been completed (that is, the residual pacing count—RPC—is 0), and there is data waiting to be sent (that is, the data is being produced faster than the pacing is being allowed to flow), then the data sender determines that it is "active" and proceeds to block 304. If either condition is not net (that is, there is still pacing count left or there is no data to be sent), then the pacing count in use is keeping ahead of the data being generated and the data sender considers itself "lazy" and proceeds to block 305.

In blocks 304 and 305, the data sender records its state ("active" or "lazy") and proceeds to block 306 to update its pacing count fields.

In block 306, the data sender examines the reset window indicator in the IPM. If it is "on," the data sender executes block 307 and clears the rest of the current window by setting the residual pacing count (RPC) to 0. It then proceeds to block 308 to record to size of the next authorized window.

If the reset window indicator in the IPM (block 306) is not "on," the data sender proceeds directly to block 308. In block 308, the data sender records the size of the next authorized window by copying the next window size of the IPM into its local control block value. The data sender then exits the process.

As with the data sender, the data receiver on receiving or sending of a BIND response enters into an initializing process. In this process, the data receiver allocates one pacing buffer to the session. One is the initial window size for a session using adaptive pacing. However, it is well within the skill of the art and within the scope of the present invention for the sender and receiver to agree to assign more than one pacing buffer without deviating from the scope of the present invention.

Figure 4:
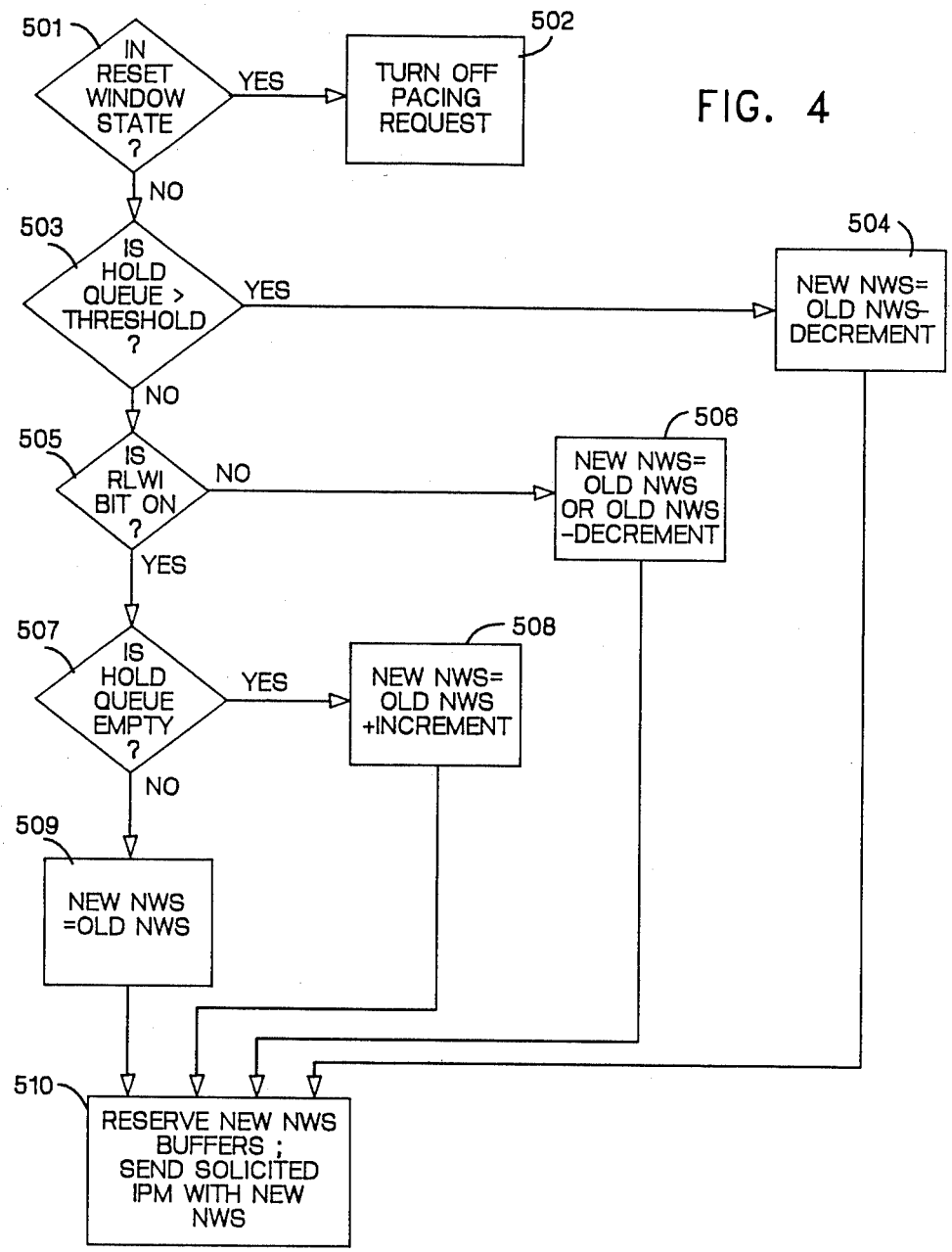
FIG. 4 shows a flow chart of a computer program, at a data receiver, for processing a received pacing request message.

On receipt of a pacing request, the data receiver enters block 501 of the process shown in FIG. 4. FIG. 4 shows a program that controls the data receiver when it is receiving a pacing request. As stated before, the format for the pacing request includes a path information unit that has an RU field plus RH field with the pacing indicator bit in the RH field set to an "on" state. If the data receiver is in reset window state (that is, awaiting a reset acknowledgment IPM), it proceeds to block 502 where it turns off the pacing indicator and exits the process.

If the data receiver is not in reset window state, it proceeds to block 503 to determine the next window size to send in the solicited IPM. In block 503, the data receiver examines the queue of data that needs to be passed on toward the destination, which may be in this node or the next node in the route. If this queue is beyond a certain size (that is, an implementation-defined specific threshold), it is considered long and the data receiver proceeds to block 504. The specific threshold is a function of the system on which the invention is implemented and is selected at design time or is determined dynamically.

In block 504, the data receiver establishes the new next window size as a value smaller than the current one in order to reduce the size of the queue it is holding. The data receiver then proceeds to block 510 to build and send the solicited IPM. If in block 503, the data receiver determines that the queue is not long, it proceeds to block 505. In block 505, the data receiver examines the request larger window size indicator (RLWI) to see if the data sender wants a larger window to be authorized. If the data sender indicated that it did not need a larger window (RLWI is "off"), the data receiver proceeds to block 506.

In block 506 the data receiver establishes the new next window size as the same as the current one or a smaller value. The data receiver then proceeds to block 510 to build and send the solicited IPM. If in block 505 the data receiver determines that the data sender did want a larger window, if possible, it proceeds to block 507 to determine if it should increase the window size. In block 507, the data receiver examines the queue of data that needs to be passed on toward the destination. If this queue is empty, it is considered short and the data receiver proceeds to block 508. In block 508 the data receiver sets the new next window size to be larger than the current window size. This allows data to flow more quickly towards its destination since the data sender has indicated that it can send it faster and the data receiver has determined that it can receive it faster. The data receiver then proceeds to block 510 to build and send the solicited IPM.

If in block 507 the data receiver determines that the queue of data was not empty it proceeds to block 509 and establishes a new next window size as the same as the current window size keeping the data flow the same as it is. The data receiver then proceeds to block 510. In block 510 the data receiver has determined the appropriate next window size, reserves that number of pacing buffers for the session, and builds and sends the solicited IPM with the determined next window size. The data receiver then exits the process.

Figure 5:
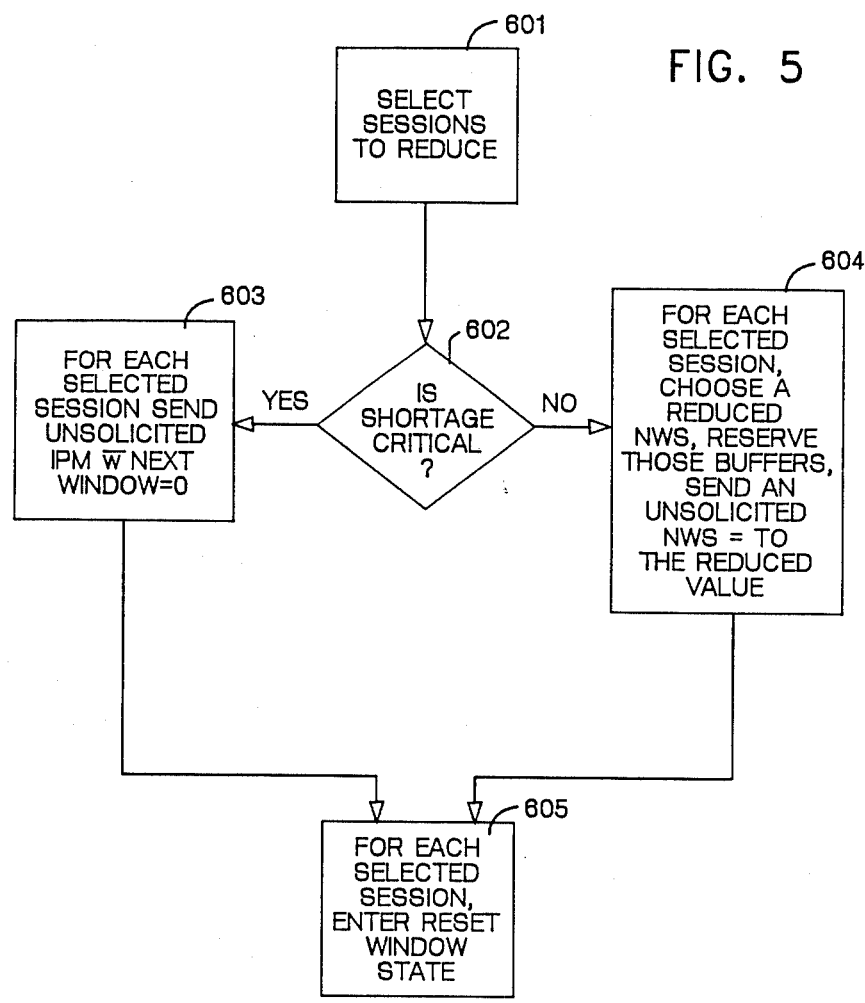
FIG. 5 shows a flow chart of a computer program at a data receiver for handling a buffer shortage.

As is evident from the above description, the data receiver must make sure that the number of pacing buffers that it reserves for handling the session is sufficient to contain the information it is receiving. Thus, FIG. 5 shows a process that controls a node receiver on the occurrence of a buffer shortage. The data receiver enters the process at block 601 when it is notified that there is a buffer shortage. The shortage is usually reported by a function located at the node and called the buffer manager. The data receiver, on receiving notification, looks at all sessions for which it is a data receiver and selects the sessions whose pacing count it will reduce. It then proceeds to block 602.

In block 602, the data receiver decides if the shortage is critical. If it is, the data receiver proceeds to block 603. In block 603 the data receiver builds and sends an unsolicited IPM with the next window size set to 0 for each of the selected sessions. This is called a "hard slam" in FIG. 6. It then proceeds to block 605 where it places each selected session in a reset window state. While the session is in the reset window state, no pacing requests are honored.

If in block 602, it was determined that the shortage was not critical, the data receiver proceeds to block 604. In block 604, the data receiver determines a new reduced next window size for each selected session and for each selected session builds and sends an unsolicited IPM with the next window size set to the value calculated for that session. It then proceeds to block 605 and exits the routine.

Figure 6:
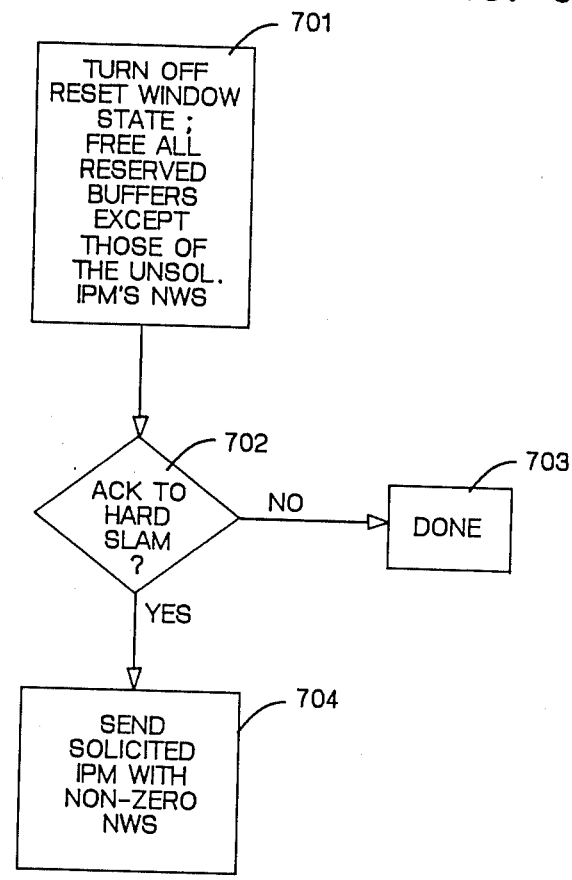
FIG. 6 shows a flow chart of a computer program at a data receiver for processing a received reset acknowledgment IPM.

FIG. 6 shows a process that controls a data receiver when it receives an acknowledgment IPM. On receiving this message (block 701), the data receiver turns off reset window state for the session and frees all pacing buffers assigned to this session except those authorized in the unsolicited IPM to which this is an acknowledgment. The data receiver then descends to block 702.

In block 702, the data receiver determines if the unsolicited IPM being acknowledged was a "hard slam." A hard slam occurs when a data sender is told that the next window size is a "0". If it was not a hard slam, the data receiver proceeds to block 703 and exits the process. If the unsolicited IPM was a hard slam, the data sender has not been authorized to send any data. The data receiver, therefore, proceeds to block 704 and sends the solicited IPM with a non-zero next window size when it has buffers available. It then exits this process.

OPERATION

Once a session is established between a data sender and a data receiver, there are one or more pacing stages established for the session. The number of stages depends on the configuration over which the session flows. Note that each LU is both a data sender and a data receiver. Pacing occurs simultaneously and independently in the two directions. On each sender end of a pacing stage, there is a component in the transmission services layer of SNA that sends a pacing request. The receiver is on the data sink side of the session stage and receives pacing requests, generates pacing responses, and determines the next window size. Independent and separate algorithms are used for controlling the data sender and the data receiver, respectively.

Whenever the residual pacing count is non-zero and a normal-flow request is queued to be sent, the data sender sends it to the data receiver and decrements the residual pacing count by one. If, at any time, the residual pacing count is 0 and the next window size is non-zero, then the residual pacing count is set to the next window size. The next window size is reset to 0, and the pacing indicator is set "on" in the RH of the next request sent. When an unsolicited IPM is received, a reset acknowledgment is returned immediately. If the reset window indicator is set "on," then the residual pacing count is set to zero. Regardless of the setting of the reset window indicator, the value of the next window size is obtained from the pacing response. If at any time the data sender determines that it needs a larger window size to handle data, it sets the RLWI bit in the RH field in the pacing request, thus indicating to the data receiver that it would like to have a larger next window size. When the sender receives a solicited IPM and the send pacing count is 0 (indicating the entire previous pacing window has been sent), and the sending pacing queue is not empty (indicating that there are more requests to send) then the sender becomes "active." Otherwise, the sender is "lazy." When an "active" sender sends a pacing request, RLWI is set on to request a larger window. When a "lazy" sender sends a pacing request, RLWI is set off indicating a larger window size is not needed. The pacing request receiver uses the RLWI value in calculating the next window size value to be sent to the next pacing response.

The sender receives an implicit pacing count of 1 when the session is activated, and sends one request with the pacing indicator set. At this point, the receiver may increase the window size in the pacing response.

The receiving unit has control and responsibility for session pacing and implements the degree of complexity necessary to manage buffers. When a pacing request is received, the receiver determines the next window size and sends it in a solicited pacing response.

An unsolicited pacing message with the reset window indicator on is sent whenever the receiver node becomes congested, i.e., cannot accept more data. The impetus for the generation of an unsolicited pacing response is the responsibility of the buffer manager. Only one unsolicited IPM can be outstanding at a time. The receiver is responsible for sending pacing responses to appropriate pacing requests and ignoring others. When a receiver node sends an unsolicited pacing response, it is resetting the pacing window and should not send a pacing response to any pacing request still on the pacing queue. A method for ignoring pacing requests is to enter a "reset window" state upon the sending of an unsolicited IPM, and to turn off the pacing indicator in all pacing requests now on the queue or placed in the pacing queue before the reset acknowledgment is received.

The receipt of the reset acknowledgment causes exit from the reset window state.

When a pacing request is removed from the pacing queue by the receiver, a solicited pacing response is returned to the sending node provided a reset acknowledgment is not outstanding. If a reset acknowledgment is outstanding, no response is sent because the reset cleared all outstanding pacing requests and responses and a pacing request will arrive after the reset acknowledgment.

The data sender is stopped from sending normal-flow requests when it gets an unsolicited IPM with a window size of 0. When the pacing request receiver gets the reset acknowledgment (the response to the unsolicited IPM), the data sender's window size has been reset to 0 and no further normal-flow requests may be sent by it. In order to resume data traffic flow (allowing the data sender to send normal flow requests), a solicited IPM (which always contains a non-zero window size) is sent by the data receiver. The data sender may resume sending normal-flow requests when the solicited IPM has been received. The next window size value used in this solicited IPM is usually small (for example, 1).

Several benefits to the user of the dynamic session level pacing described herein. Among the benefits are:

Systems, at the session level, can adapt to network load by dynamically controlling the number of packets sent in each window. In other words, the receiver can increase or decrease the number of packets sent in each window at any time while the data is being sent, thereby better managing its resources.

The receiving system has total control of the flow of data to it. This is important because the receiver must commit the storage resources to handle the sender's transmission.

The range of window sizes is large. The receiver can specify any window size from 0 (halting the flow of data) to N where N=1, 2, 3, 4 . . . 32767 (allowing varying throughput).

The necessity for accurate window values to be specified at system definitions is eliminated because optimum window sizes can be determined by sytems according to the current environment. This eases the chore of system definition and results in better tuning of the network.

Adaptive session level pacing is a super-set of, and therefore fully compatible with, fixed session-level pacing. This makes it easy to gradually introduce adaptive pacing into an existing network.

If the receiver is experiencing extreme congestion, it can choose a window size of 0. This allows systems to control the flow of data at the session level without the danger of deadlock.

Via the feedback mechanism (the reset acknowledgment), the sender confirms changes the receiver makes in its window size for reset. This allows the receiver fine control over its resources because upon receipt of the acknowledgment the receiver knows exactly its resource commitment.

If the window size of a session is not limited by buffer constraints, the algorithm automatically adjusts the window size to maximize throughput, so that throughput is limited only by the capacity of the communications medium.

If the window size of a session is not limited by buffer constraints, the algorithm is able to increase the window size so as to reduce the link and processing overhead of IPMs.

While the invention has been particularly shown and described with reference to the particular embodiment thereof, it will be understood by those skilled in the art that various changes in form and details may be made therein without departing from the spirit and scope of the invention.

Having thus described our invention, what we claim and desire to secure as Letters Patent is as follows:

1. A method for controlling the exchange of messages in a computing network, said network including a plurality of nodes coupled by a communications network with at least two of said nodes coupled by at least one session over which the messages are exchanged, said method including the steps of:

generating at a receiving node a first flow control message; said message having a first field in which a sequence of bits representative of a value to be used as a next window size is placed and an indicium set to a first state when said receiving node wants a sending node to immediately discontinue sending data with a current window size and to substitute the next window size for the current window size in subsequent transmissions or said indicium set to a second state only if the receiving node authorizes the sending node to complete transmission with the current window size and thereafter use the next window size; and transmitting said flow control message to the sending node.

2. The method set forth in claim 1 further including the steps of generating a second field carrying one set of coded bits selected from a plurality of sets to identify the type of message being transmitted.

3. The method of claim 2 further including the steps of receiving, at the sending node, the flow control message;

examining the indicium and if said indicium is set to the first state preparing a second flow control message with a second set of coded bits disposed in the second field;

a second sequence of bits disposed in the first field and having a pattern identical to that received in the first flow control message; and transmitting said second flow control message to the receiving node.

4. The method set forth in claim 1 wherein the first state is a logical "1" and the second state is a logical "0."

5. The method of claim 2 wherein a logical "00" code is representative of a first type of flow control message and a logical "01" code is representative of a second type of flow control message.

6. The method of claim 3 wherein the second set of coded bits includes a logical "10" which is representative of a third type of flow control message.

7. In a computer network having a plurality of nodes interconnected by a communications network with each node including means for establishing at least one session upon which messages can be exchanged between a sending node and a receiving node, an improved method for dynamically adjusting the window size of messages comprising the steps of:

generating and transmitting from the sending node a flow control message having: a first field designated for carrying information; and remainder fields with a first indicium being set to a first state if the information contained therein is the first in a window or said indicium being set to a second state if the information contained therein is other than the first in said window.

8. The method set forth in claim 7 further including the step of generating in said remainder fields a second indicium being set to a first state only if said sending node requires a window larger than a current one.

9. The method set forth in claim 7 or claim 8 further including the steps of receiving the flow control message at the receiving node;

determining the size of the information window that said receiving node is able to accept; and generating and transmitting to said sending node a response flow control message; said message including a field in which a sequence of bits specifying a next window size is placed.

10. The method of claim 9 further including the steps of receiving, at the sending node, the response flow control message and thereafter adjusting the window size for subsequent transmissions to mirror that in the response flow control message.

11. In a computer network having a plurality of nodes interconnected by a communications network with each node including means for establishing a sessions upon which messages are exchanged between a sending node and a receiving node, an improved message format for carrying flow control information comprising:

means at the node for generating said message format with a first field for carrying a sequence of bits representative of a next window size that said sending node is permitted to transmit to said receiving node;

remainder fields concatenated to said first field and having a type field designated to carry one sequence from a plurality of bit sequences which identify the type of flow control information and a reset window indicator field for carrying an indicium when set to a first state informing said sending node to exchange a current window size for the next window size carried in the first field or said indicium when set to a second state informing said sending node to complete transmission with the current window size before changing to the next window size in the first field.

12. In a digital data communications system wherein a plurality of nodes are interconnected by a communications network, a method for controlling the flow of data between a sending node and a receiving node comprising the steps of:

at the receiving node, generating and transmitting to the sending node a flow control message; said flow control message including a first field carrying a sequence of bits specifying the message type, a second field carrying a sequence of bits specifying a window size and a two-state indicium being set in a first state only if the receiving node wants said sending node to adjust the size of the window immediately.

13. The method set forth in claim 12 wherein the indicium is being set to a second state if the receiving node wants said sending node to adjust the size of the window in subsequent transmissions.

14. The method set forth in claim 12 further including the steps of receiving the flow control message at said sending node;

examining the message and generating and transmitting a second flow control message only if the two state indicium is set to the first state whereby the second flow control message includes a sequence of bits confirming the size of a new window and indicating that no more data from previous windows is forthcoming.

15. In a digital data communications system wherein a plurality of nodes are interconnected by a communications network, a method for controlling the flow of data between a sending node and a receiving node comprising the steps of:

at the sending node, generating and transmitting to the receiving node a flow control message having a first sequence of bits specifying the message type and a second sequence of bits associated with a window size.

16. The method set forth in claim 7 further including the step of coding the first field of the flow control message with a value equal to a window size value contained in a previously received flow control message.

17. An apparatus for controlling the exchange of messages in a computing network, said network including a plurality of nodes coupled by a communications network with at least two of said nodes coupled by at least one session over which the messages are exchanged, said apparatus including:

means at a receiving node for generating a first flow control message; said message having a first field in which a sequence of bits representative of a value to be used as a next window size is being placed; an indicium being set to a first state when said receiving node wants a sending node to immediately discontinue sending data with a current window size and to substitute the next window size for the current window size in subsequent transmissions or said indicium being set to a second state only if the receiving node authorizes the sending node to complete transmission with the current window size and thereafter use the next window size; and means for transmitting said flow control message to the sending node.

* * * * *

UNITED STATES PATENT AND TRADEMARK OFFICE
CERTIFICATE OF CORRECTION

PATENT NO. : 4,736,369

DATED : April 5, 1988

INVENTOR(S) : Tsipora P. Barzilai et al

It is certified that error appears in the above-identified patent and that said Letters Patent is hereby corrected as shown below:

Col. 1, line 56, change "sevel" to -- seven --.

Col. 16, line 10, (in Claim 11) change "sessions" to -- session --.

Signed and Sealed this

Sixteenth Day of August, 1988

Attest:

DONALD J. QUIGG

Attesting Officer

Commissioner of Patents and Trademarks